US009128960B2

(12) United States Patent
Moha et al.

(10) Patent No.: US 9,128,960 B2
(45) Date of Patent: Sep. 8, 2015

(54) ASSISTED IMAGE SELECTION

(75) Inventors: Alexandre Moha, Gentilly (FR); Cédric Bray, Vincennes (FR); Yan Arrouye, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 728 days.

(21) Appl. No.: 13/007,587

(22) Filed: Jan. 14, 2011

(65) Prior Publication Data

US 2012/0182316 A1     Jul. 19, 2012

(51) Int. Cl.
*G09G 5/30* (2006.01)
*G06F 17/30* (2006.01)
*G06T 3/40* (2006.01)

(52) U.S. Cl.
CPC ............ *G06F 17/30274* (2013.01); *G06T 3/40* (2013.01)

(58) Field of Classification Search
CPC ........................................................ G06T 3/40
USPC ........................................................ 345/619
See application file for complete search history.

(56) References Cited

U.S. PATENT DOCUMENTS

| | | | | |
|---|---|---|---|---|
| 7,131,059 | B2 * | 10/2006 | Obrador | 715/209 |
| 8,140,570 | B2 * | 3/2012 | Ingrassia et al. | 707/770 |
| 8,799,277 | B2 * | 8/2014 | Park et al. | 707/724 |
| 2002/0054017 | A1 * | 5/2002 | Agata et al. | 345/157 |
| 2004/0100497 | A1 * | 5/2004 | Quillen et al. | 345/751 |
| 2005/0091272 | A1 | 4/2005 | Smith et al. | |
| 2006/0167896 | A1 * | 7/2006 | Kapur et al. | 707/10 |
| 2007/0003266 | A1 * | 1/2007 | Schmitt et al. | 396/56 |
| 2008/0091606 | A1 * | 4/2008 | Grecia | 705/51 |
| 2008/0163379 | A1 * | 7/2008 | Robinson et al. | 726/27 |
| 2008/0307343 | A1 * | 12/2008 | Robert et al. | 715/765 |
| 2009/0100096 | A1 * | 4/2009 | Erlichson et al. | 707/104.1 |
| 2009/0106674 | A1 * | 4/2009 | Bray et al. | 715/762 |
| 2009/0119333 | A1 * | 5/2009 | Sundstrom et al. | 707/104.1 |
| 2009/0307626 | A1 * | 12/2009 | Jalon et al. | 715/771 |
| 2010/0042616 | A1 * | 2/2010 | Rinearson | 707/5 |
| 2010/0050123 | A1 | 2/2010 | Sherrard et al. | |
| 2010/0105437 | A1 | 4/2010 | Lee et al. | |
| 2010/0211575 | A1 * | 8/2010 | Collins et al. | 707/749 |
| 2010/0216441 | A1 | 8/2010 | Larsson et al. | |
| 2010/0262928 | A1 * | 10/2010 | Abbott | 715/769 |
| 2010/0317335 | A1 * | 12/2010 | Borovsky et al. | 455/419 |
| 2011/0022958 | A1 * | 1/2011 | Kang et al. | 715/716 |

(Continued)

OTHER PUBLICATIONS

Visual Users' Guide Photo Contacts Pro 6" 2010, a user manual, PocketX.*

(Continued)

*Primary Examiner* — Javid A Amini
(74) *Attorney, Agent, or Firm* — Fish & Richardson P.C.

(57) ABSTRACT

Assisted face selection is disclosed. According to some implementations, a method can include obtaining contact information associated with a contact and displaying on an interface of a computing device an image (e.g., a thumbnail image) representative of the contact. The method can include receiving an indication to change the contact-representative image, determining that one or more other images from a plurality of other images correspond to the contact based on the contact information, and displaying the one or more other images. The method can include receiving a selection of one of the one or more other images and displaying on the interface the selected image as the contact-representative image. Receiving the indication can include receiving a selection of the displayed contact-representative image. Automatic selection of images is also disclosed.

16 Claims, 8 Drawing Sheets

(56) References Cited

U.S. PATENT DOCUMENTS

| | | |
|---|---|---|
| 2011/0093266 A1* | 4/2011 | Tham .......................... 704/246 |
| 2011/0145305 A1* | 6/2011 | Kamei et al. ................. 707/822 |
| 2011/0307504 A1* | 12/2011 | Agrawal et al. .............. 707/766 |
| 2012/0158730 A1* | 6/2012 | Ingrassia et al. ............. 707/740 |
| 2012/0184362 A1* | 7/2012 | Barclay et al. ................. 463/25 |

OTHER PUBLICATIONS

"Photo Contacts PRO (Pocket PC Edition)," PocketX Software Inc., [online], Retrieved from the Internet: URL: <http://www.pocketx.net/products/photocontactspro_ppc/>, retrieved on Jan. 21, 2011, 13 pages.

* cited by examiner

US 9,128,960 B2

ASSISTED IMAGE SELECTION

TECHNICAL FIELD

The disclosure generally relates to user interfaces for image selection.

BACKGROUND

Software applications may use thumbnail images of users or contacts. For example, a chat application may display thumbnail images of a user of the chat application. An address book application may display images that represent contacts in the address book.

SUMMARY

Assisted face selection is disclosed. According to some implementations, a method can include obtaining contact information associated with a contact and displaying on an interface of a computing device an image (e.g., a thumbnail image) representative of the contact. The method can include receiving an indication to change the contact-representative image, determining that one or more other images from a plurality of other images correspond to the contact based on the contact information, and displaying the one or more other images. The method can include receiving a selection of one of the one or more other images and displaying on the interface the selected image as the contact-representative image. Receiving the indication can include receiving a selection of the displayed contact-representative image.

According to some implementations, displaying the one or more other images can include displaying the contact-representative image in the center of an arrangement of the one or more other images. The arrangement can be a grid of cells displaying candidate contact-representative images. The contact-representative image may be displayed in the center cell of the grid view. The one or more other images can be displayed (or arranged) in the others cells of the grid view based on one or more dates associated with the one or more other images. The one or more other images can be displayed (or arranged) based on a user-assigned ranking associated with the one or more other images.

According to some implementations, the contact information can include a name associated with the contact. Determining that one or more other images from the plurality of other images correspond to the contact can include determining that the one or more other images are associated with the name.

According to some implementations, the contact information can include image data corresponding to the contact-representative image. Determining that one or more other images from the plurality of other images correspond to the contact can include determining that the one or more other images correspond to the image data. Determining that one or more contact images in the plurality of images correspond to the contact can include performing a facial recognition algorithm to identify one or more images that contain a facial view of the contact.

According to some implementations, obtaining contact information can include obtaining a new image of the contact from an image capture device. Determining that one or more contact images in the plurality of images correspond to the contact can include performing a facial recognition algorithm to identify one or more images that contain a facial view of the contact.

According to some implementations, a method can include obtaining information associated with a contact and, based on the contact information, automatically determining that one or more images in a plurality of images correspond to the contact. The method can include automatically selecting one of the one or more images based on metadata associated with the one or more images and displaying the automatically selected image on an interface of a computing device. The selected image can be automatically selected based on metadata that indicates the selected image has been marked as a key image. The selected image can be automatically selected based on metadata that indicates the selected image is the most recent of the one or more images. The selected image can be automatically selected based on metadata that indicates the selected image has the highest user-assigned ranking of the one or more images.

According to some implementations, a method can include displaying an image representative of a contact, receiving an indication to change the representative image, capturing a new image of the contact with an image capture device, performing facial recognition on the new image and one or more other images to identify other images that contain a facial view of the contact, and displaying the other images and the new image. The method can also include receiving a selection of an image from the other images and the new image and displaying the selected image as the representative image of the contact.

According to some implementations, a method can include capturing an image of a contact, determining whether the captured image includes a facial view of the contact using facial recognition, and, if the captured image includes a facial view of the contact, automatically associating the captured image with the contact. The method can include displaying the captured image as a contact-representative image on an interface of a computing device. The method can be performed automatically in response to capturing the image of the contact.

A non-transitory computer-readable medium and a system for performing the methods disclosed above are also disclosed. Details of one or more implementations are set forth in the accompanying drawings and the description below. Other features, aspects, and potential advantages will be apparent from the description and drawings, and from the claims.

DETAILED DESCRIPTION

Assisted face selection is disclosed. According to some implementations, a user may be assisted in selecting an image to represent a contact by comparing contact information associated with the contact to metadata associated with images and presenting images having metadata matching the contact information to a user for selection. In some implementations, image data is compared using facial recognition analysis. For example, facial recognition analysis can be used to compare a known image of a contact to other images to determine which of the other images include the face of the contact. In some implementations, images determined to correspond to the contact may be displayed on a user interface so that a user may select an image to represent the contact. In some implementations, contact-representative images can be automatically selected based on metadata associated with images or image analysis (e.g., facial recognition analysis). Other implementations are described.

Face Selection User Interfaces

Figure 1:
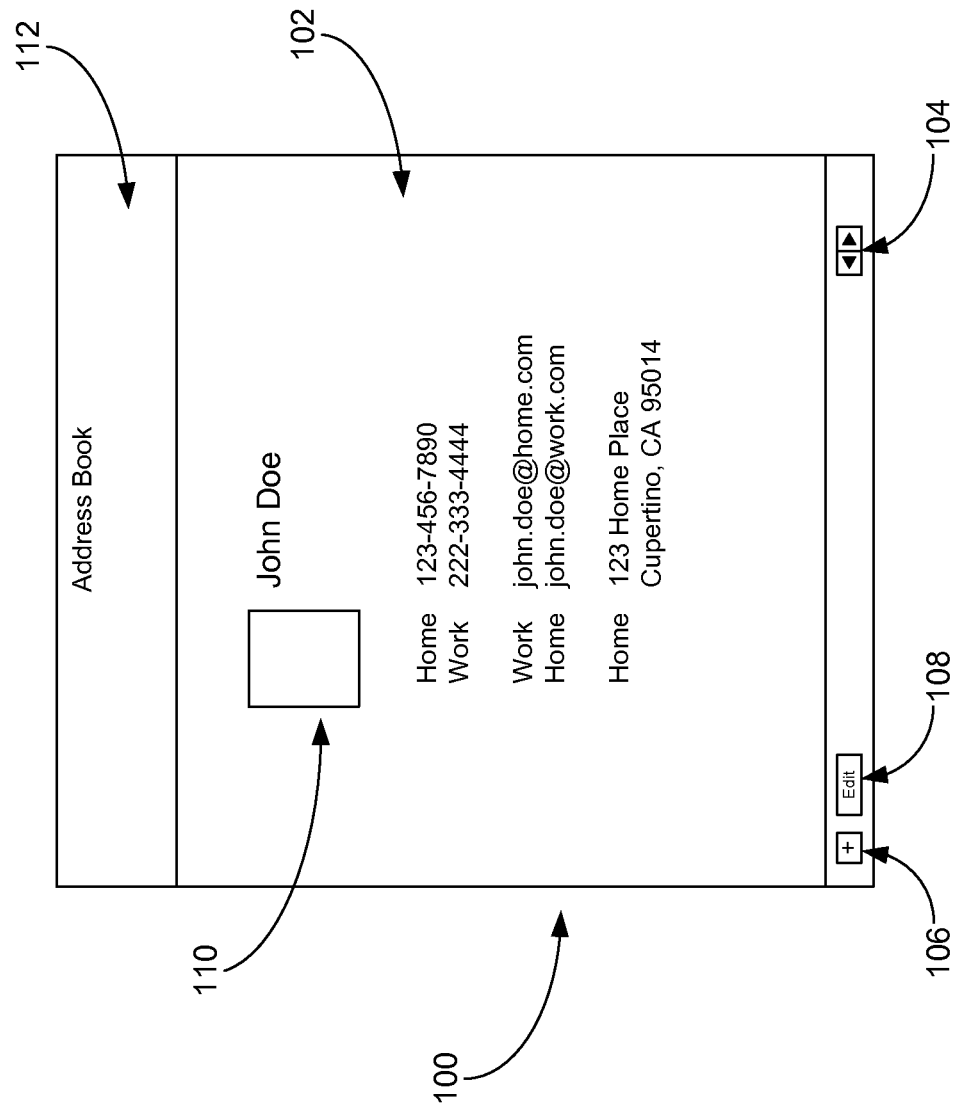
FIG. 1 illustrates an example user interface having an image of a contact.

FIG. 1 illustrates an example user interface 100 having an image representing a contact. For example, user interface 100 may be an interface for an address book application that displays contact information for a contact. A contact can be a person, business, or other entity. User interface 100 can include title bar 112 and information area 102. For example, information area 102 may display contact information, such as telephone numbers, e-mail addresses, or physical addresses associated with a contact. Information area 102 can include an image 110 that represents a contact.

User interface 100 can include interface element 106 which, when selected by a user, causes a new contact to be added to the address book. For example, in response to selecting user interface element 106, a new contact entry may be generated in the address book and the user may be allowed to enter contact information for the contact. User interface 100 can include user interface element 108 which, when selected by a user, allows the user to edit various fields displayed in information area 102. For example, upon selection of user interface element 108, contact information, such as the telephone number, email address, and physical address fields, of the displayed contact may be made editable so that a user may modify the contact information. User interface 100 can include user interface element 104 which, when selected, allows a user to move between contacts in the address book. For example, when user interface element 104 is selected, the address book may display the previous or next contact in the address book.

According to some implementations, a user can indicate to user interface 100 a desire to change image 110 by selecting user interface element 108. In some implementations, a user can indicate a desire to change image 110 by selecting image 110. For example, image 110 may be selected by a user thereby causing one or more user interfaces for selecting a new or different image to be displayed. The user may select a new image for image 110 by interacting with the one or more user interfaces.

Figure 2:
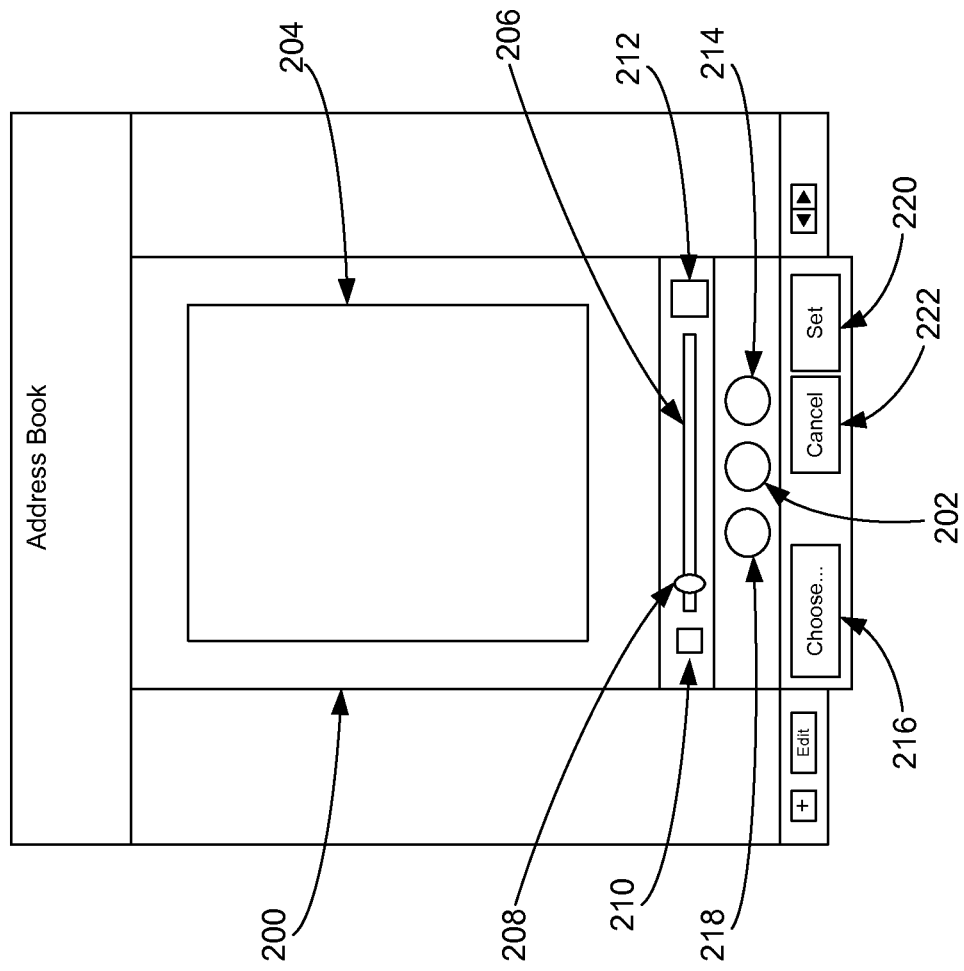
FIG. 2 illustrates an example user interface for capturing an image.

FIG. 2 illustrates an example user interface 200 for capturing an image to represent a contact. For example, user interface 200 may be used to capture a photograph of a contact to be used as the image representing the contact. User interface 200 can include user interface element 202. For example, user interface element 202 may be a button that causes an image of a contact to be captured by an image capture device, such as a camera. When selected, user interface element 202 may cause an image to be captured and displayed in image display area 204. User interface 200 can include slider bar 206. For example, the image displayed in image display area 204 may be resized using slider 208 and slider bar 206. Slider 208 may be moved along slider bar 206 to magnify the image displayed in image display area 204, for example. If slider 208 is moved toward user interface element 210, the magnification of the image may be reduced. If slider 208 is moved toward user interface element 212, the magnification of the image may be increased.

User interface 200 can include user interface element 214 which, when selected, causes an interface to be displayed that allows a user to select an effect (e.g., make black and white, glow, thermal camera image, X-ray image) to apply to the image in image display area 204. User interface 200 can include user interface element 216 which, when selected, allows a user to browse for an image. For example, user interface element 216 may be a button that opens a user interface (e.g., an open file window or image browser) that allows a user to browse directories on a storage device and select an image. In some implementations, the selected image may be displayed in image display area 204.

User interface 200 can include user interface element 220 which, when selected, causes the image displayed in image display area 204 to be set as the contact-representative image. For example, user interface element 220 may be a button which, when selected by a user, sets the image displayed in image display area 204 as the image (e.g., image 110) representing the displayed contact. Selection of user interface element 220 may also cause user interface 200 to close. User interface 200 can include user interface element 222 which, when selected, causes user interface 200 to close without changing the image representing the displayed contact, e.g., image 110.

User interface 200 can include user interface element 218 which, when selected, causes assisted face selection to be performed. For example, user interface element 218 may be a button which, when selected by a user, triggers assisted face selection and causes a user interface to be displayed that presents an array of images that correspond to the contact, as disclosed in detail with reference to FIG. 3 below.

Figure 3A:
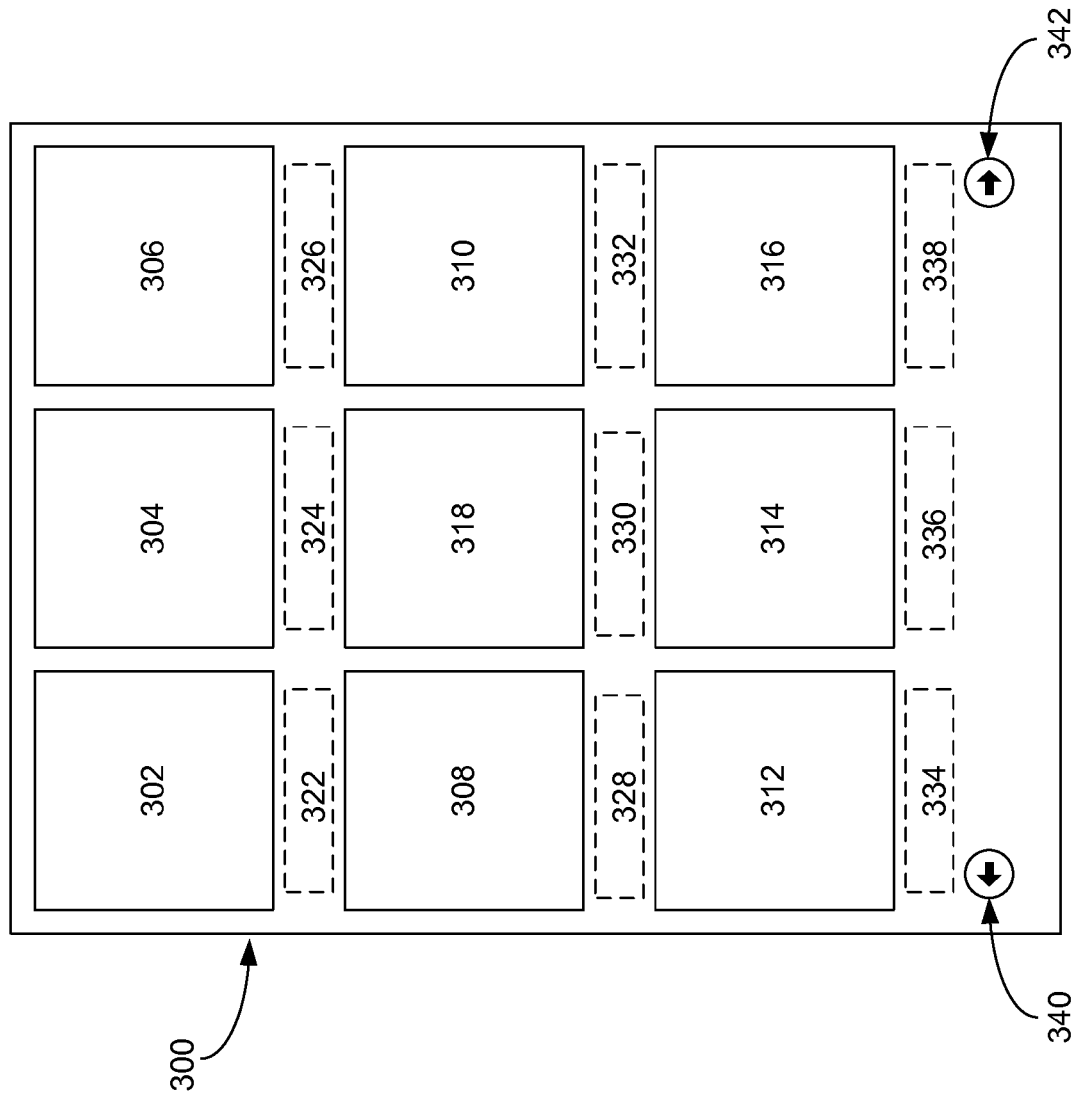
FIGS. 3A and 3B illustrate an example user interface for selecting an image.
Figure 3B:
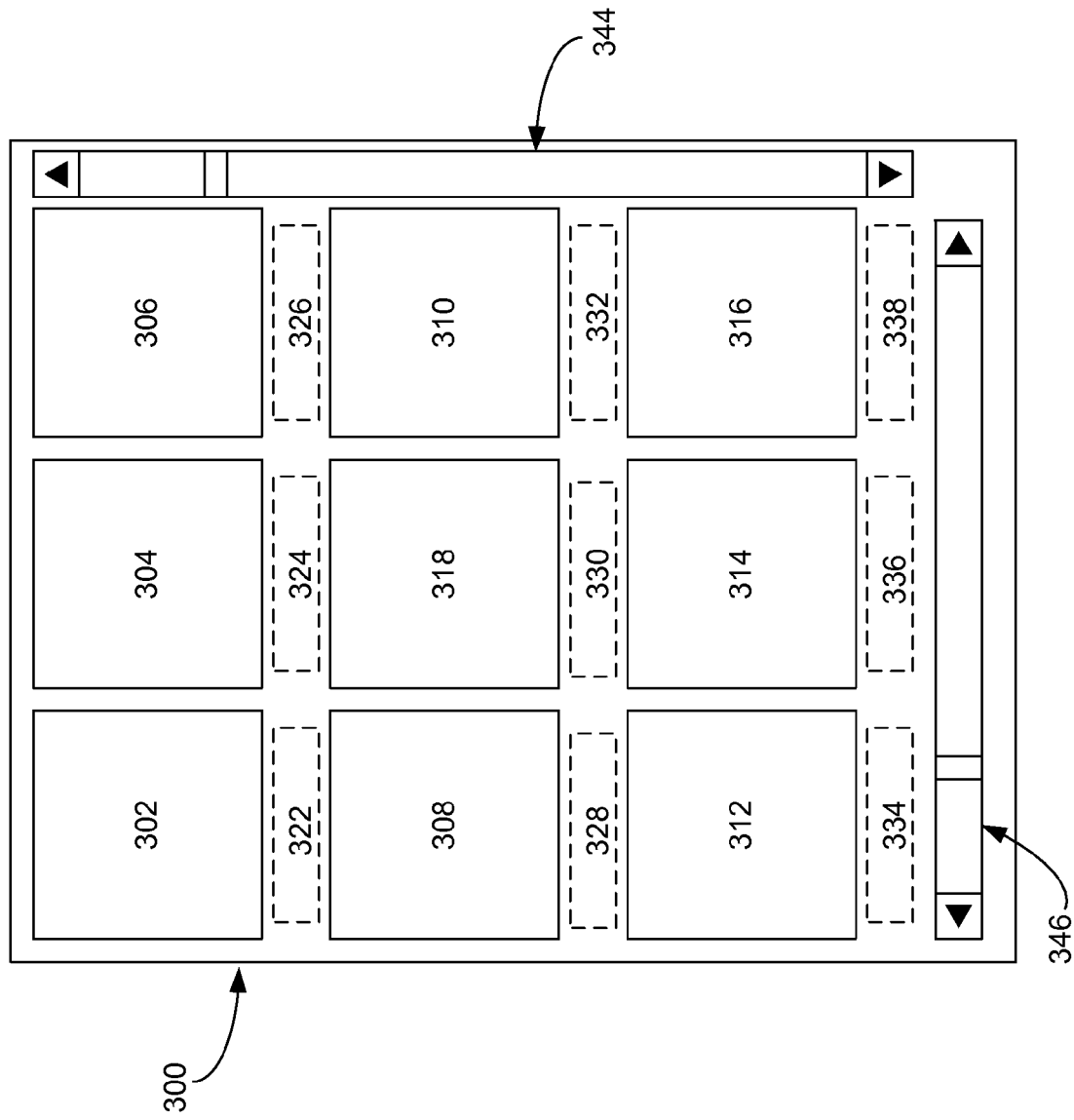

FIGS. 3A and 3B illustrate an example user interface 300 for selecting an image to represent a contact. According to implementations, user interface 300 may be displayed in response to a user selecting user interface element 218 in FIG. 2. According to some implementations, user interface 300 may be displayed in response to a user selecting image 110 of FIG. 1. According to some implementations, user interface 300 may present images corresponding to a currently displayed contact.

In some implementations, user interface 300 may be displayed as a pop-up window. In some implementations, user interface 300 may be animated to appear to slide downward out from the bottom of title bar 112 of FIG. 1. In some implementations, user interface 300 may be animated to appear to expand outward from image display area 204 of FIG. 2. For example, user interface 300 may be animated so that the images displayed in user interface 300 appear to slide out from behind a center image that corresponds to the image displayed in image display area 204 of FIG. 2. The center image of user interface 300 may be displayed centered over image display area 204.

User interface 300 can include a two-dimensional grid view of images (e.g., images 302-318). Image 318 in the center cell may correspond to an image currently representing a contact (e.g., image 110 of FIG. 1). Image 318 may correspond to an image displayed in image display area 204 of FIG. 2. For example, image 318 may be an image currently representing a contact.

Images 302-316 may include other images corresponding to the contact and accessible to user interface 300. Images 302-316 may be candidates for replacing the current contact-representative image. For example, images 302-316 may be images other than the image currently representing the contact. Images 302-316 may be stored on a storage device accessible to user interface 200. For example, images 302-316 may be stored on a local storage device or a network storage device. Images 302-316 may include photographs of the contact. Images 302-316 may have associated metadata that corresponds to contact information associated with a contact. For example, images 302-316 may be photographs of the contact that have been tagged (e.g., labeled) with the contact's name or other contact information. For example, a user may use photo editing, management or storage applications to tag or label images 302-316 and the metadata associated with images 302-316 may include the tags or labels. Metadata for the images may include a user-assigned ranking of the images. For example, a user may have previously indicated how much the user likes particular photos by assigning a ranking to each of the photos. All, some, or none of the photos may be assigned a ranking by the user, for example. Metadata for the images may include event information. For example, photographs may have been captured at an event (e.g., a picnic, party, or outing) and the photos may be labeled to indicate the event at which the photos were captured. Metadata for the images may include the date when the images were captured.

Images 302-318 may be arranged on interface 300 with the image currently representing the contact (e.g., image 318) at the center of the arrangement and the other images (images 302-316) arranged around image 318. In some implementations, images 302-316 are arranged in chronological, or reverse chronological, order. For example, the metadata associated with images 302-316 may be analyzed to determine when the images were captured and the images may be arranged around image 318 in chronological, or reverse chronological, order from left to right, top to bottom. In some implementations, images 302-316 are arranged according to ranking. For example, images 302-316 may be arranged around image 318 according to a user-assigned ranking associated with the images. The images may be arranged according to ranking from left to right, top to bottom with the highest ranked images at the top left and the lowest ranking at bottom right. In some implementations, images 302-316 may be arranged according to an event associated with the images. For example, the images displayed together on user interface 300 may be images from a single event. The user may be able to select which events the user is interested in and display only the images from the selected event. In some implementations, images 302-316 can be displayed in three dimensions in a three-dimensional user interface.

Labels 322-338 display information descriptive of the images 302-318. For example, label 322 may provide information associated with image 302. Label 330 may provide information for image 318. For example, label 330 may indicate that image 318 is the "original" or "current" image representing a contact. Labels 322-330 may indicate a date when an image was captured, an event at which the image was captured, or a ranking for an image, for example. In some implementations, labels 322-330 can be edited by hovering a cursor over the label until a text field appears around the label to allow editing of the label.

User interface 300 can include user interface elements 340 and 342. User interface elements 340 and 342, when activated, may allow additional pages of images to be displayed in user interface 300. For example, if there are more images available for a contact than can be displayed on user interface 300, a user may cause another page of images to be displayed by selecting user interface element 340 to view a previous page of images or by selecting user interface element 342 to view a next page of images. In some implementations, the previous page of images may slide into view from the left side of user interface 300. The next page of images may slide into view from the right side of user interface 300. In some implementations, the image currently representing a contact may be displayed in the center of every image page.

As illustrated by FIG. 3B, user interface 300 can include one or more scroll bars. User interface 300 can include a vertical scroll bar 344. User interface 300 can include a horizontal scroll bar 346. For example, if there are more images available for a contact than can be displayed on user interface 300 at one time, a user may use a scroll bar to scroll through the images available for the contact on user interface 300. For example, when a user interacts with a scroll bar (e.g., scroll bar 346 or 344) some images displayed on user interface 300 may disappear from view and other images may appear in view. According to some implementations, if scroll bars are displayed on user interface 300, the current user-representative image may be listed only once among the images available for viewing on user interface 300. Scrolling may also be performed without having a user interact with the scroll bars. For example, scrolling may be performed in response to mouse input (e.g., manipulating a wheel in a mouse) or a touch-sensitive input device (e.g., a trackpad or touchpad).

According to some implementations, a user may select one of the images 302-318 displayed on user interface 300 to cause the selected image to become the image representing a contact. For example, an image selected from the images 302-318 displayed on user interface 300 may displayed as the contact-representative image 110 of FIG. 1.

Assisted Face Selection System and Process

Figure 4:
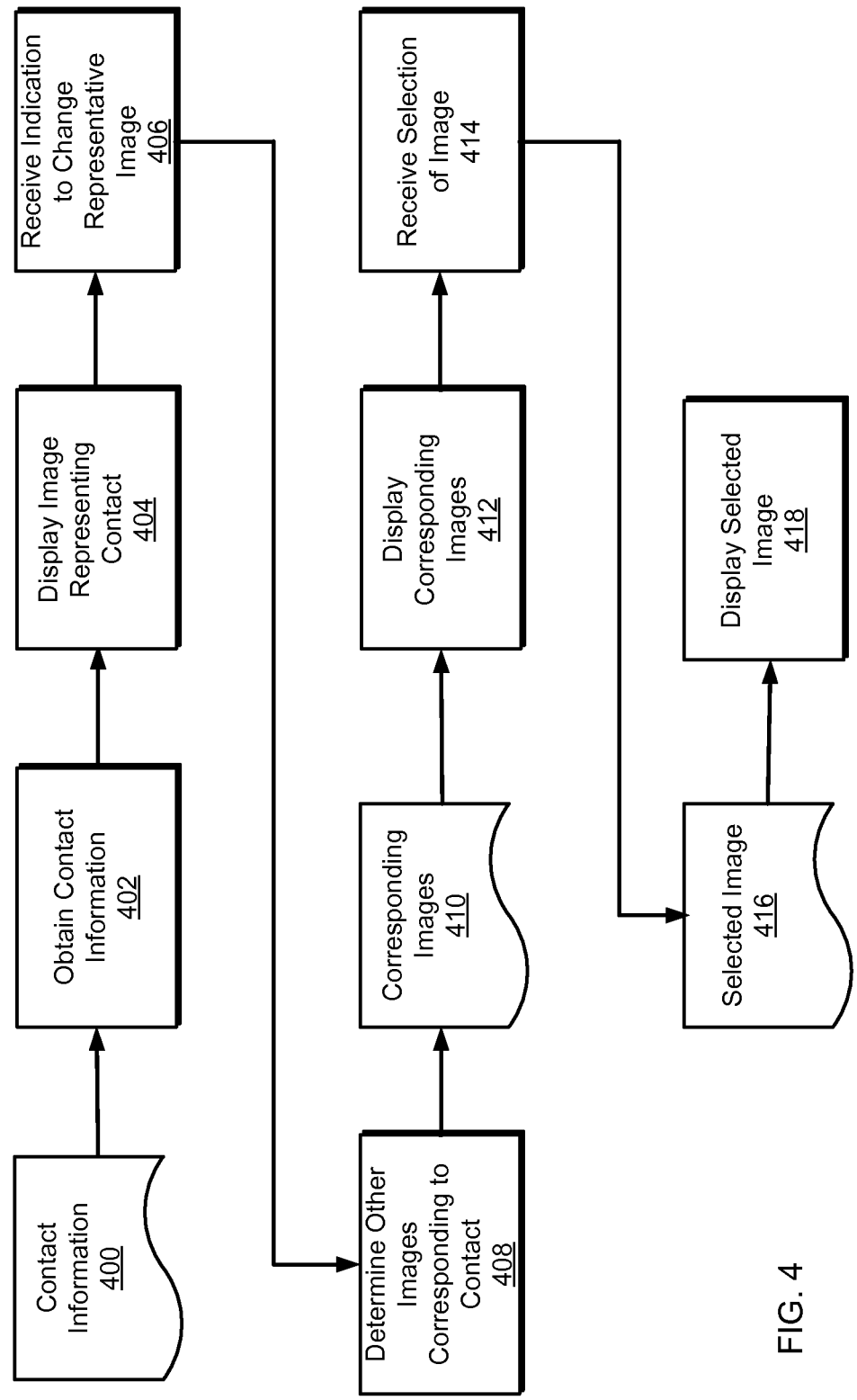
FIG. 4 is block diagram of an example assisted face selection system.

FIG. 4 is block diagram of an example assisted face selection system. At block 402, contact information 400 is obtained. For example, contact information may be obtained from an address book application, a chat application, or another application that maintains, uses or stores contact information. Contact information may be obtained from a storage device, such as a local hard drive or network drive, for example. According to some implementations, contact information may include an image that currently represents the contact. In some implementations, contact information includes location information for retrieving an image currently representing the contact. Contact information may include contact identifying information, such as names, addresses (e-mail and/or physical) and phone numbers, for example.

At block 404, an image representing the contact is displayed. For example, an image identified in the contact information as currently representing the contact may be displayed. The image may be included in the contact information or the image may be retrieved from a storage location identified in the contact information. The contact-representative image may be displayed as image 110 of FIG. 1, for example.

At block 406, an indication to change the contact-representative image is received. For example, a user may provide input selecting image 110 of FIG. 1 to indicate that the user wishes to change the image. In some implementations, in response to a user selecting image 110, user interface 200 of FIG. 2 may be displayed. In some implementations, in response to a user selecting image 110, user interface 300 of FIG. 3 may be displayed. In some implementations, user interface 300 may be displayed in response to a user selecting user interface element 218 of FIG. 2.

At block 408, other images corresponding to the contact are determined. For example, in response to receiving the indication to change the contact-representative image at block 406, other images accessible to the system are analyzed to determine whether the other images correspond to the contact. Other images may be determined to correspond to the contact by analyzing metadata associated with the other images. For example, contact information for a contact may be compared to metadata associated with other images available to the system to determine if the contact information matches the metadata for an image. If the contact information matches the metadata for an image, the image may be displayed in user interface 300 so that a user may be allowed select the image and change the contact-representative image (e.g., image 110).

According to some implementations, other images may be determined to correspond to the contact by performing facial recognition analysis on the images. For example, an image currently representing a contact, or an image known to include the contact, may be analyzed using a facial recognition algorithm to determine face-identifying information for the contact's face. The contact-representative or known image may be an image currently displayed as image 110 or an image captured with an image capture device (e.g., a camera) using interface 200. Facial recognition analysis may be performed on images available to the system based on the face-identifying information for the contact's face in order to find other images that include the contact's face. Thus, corresponding images 410 may be determined based on metadata associated with other images or facial recognition analysis of other images. Any suitable known Facial recognition algorithm or analysis can be used, including but not limited to techniques employing one or more of Principal Component Analysis, Linear Discriminate Analysis, Elastic Bunch Graph Matching, Hidden Markov model, and neuronal motivated dynamic link matching.

At block 412, corresponding images 410 are displayed. For example, corresponding images 410 may be presented to a user on user interface 300 of FIG. 3. Corresponding images 410 may be displayed on user interface 300 as images 302-316. If corresponding images 410 include more images than can fit on user interface 300, a user may move between pages of corresponding images 410 by selecting the previous and next user interface elements 340 and 342, as described above.

At block 414, a selection of an image is received. For example, a user may select one of the images 302-318 displayed on user interface 300. If the user wishes to change the current image representing a contact and displayed as image 110, a user may select one of the corresponding images 410 displayed as images 302-316, for example. If the user decides not to change the current image representing the contact, the user may cancel the image change by selecting the current contact-representative image displayed as image 318 at the center of user interface 300. In some implementations, once an image is selected from the images displayed on user interface 300, the selected image 416 may be set as the image representing the contact. Information identifying the selected image 416 may be included in contact information associated with the contact. In some implementations, once an image is selected from user interface 300, interface 300 may be closed.

According to some implementations, a user can edit the selected image. For example, upon selection of an image, the system may automatically zoom in on the contact's face in the selected image. The contact's face may be recognized in the image using facial recognition analysis as described above, for example. According to implementations, the user can crop the image so that the contact's face may be prominently displayed in the image. For example, the system may provide a user interface that allows the user to crop the image so that the contact's face fills some or all of the area of the image. The user may adjust the magnification of the image and crop the image so that other features (e.g., buildings, trees, other faces, etc.) in the image are visible in addition to the user's face, for example.

According to some implementations, each of the images 302-318 an be automatically magnified. For example, each of the images 302-318 displayed on user interface 300 may be automatically magnified (e.g., zoom in, zoom out) so that the contact's face may be prominently or clearly displayed in each of the images 302-318. The automatic magnification may also include automatically centering an image on the contact's face.

At block 418, selected image 416 is displayed. For example, when interface 300 is closed, selected image 416 may be displayed in image display area 204 in user interface 200 of FIG. 2. When user interface 300 is closed, selected image 416 may be displayed as image 110 on user interface 100 of FIG. 1, for example. In some implementations, the assisted face selection system disclosed above may be used to select images or images to represent contacts in an address book. In some implementations, the assisted face selection system above may be used to select images or images to represent contacts or buddies in a chat application, to represent users of a system on a login screen, or to represent users, contacts, buddies or friends in other applications that display images or images to represent these entities.

Figure 5:
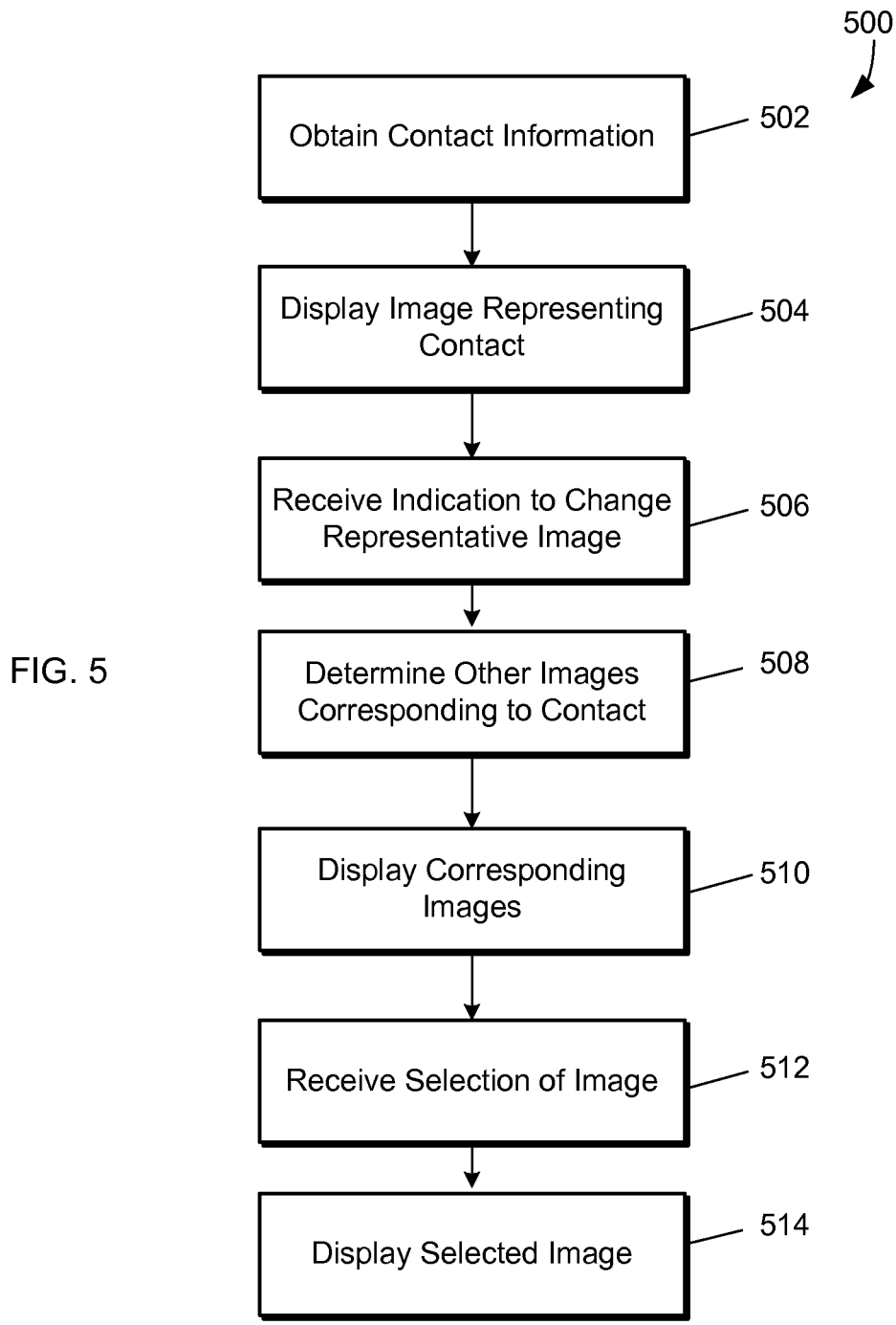
FIG. 5 is a flow diagram of an example assisted face selection process.

FIG. 5 is a flow diagram of an example assisted face selection process 500. At step 502, contact information is obtained. For example, contact information may be obtained from an address book or storage location as disclosed with reference to FIG. 4, above. At step 504, an image representing a contact is displayed. For example, an image representing a contact may be displayed as an image in an address book entry as illustrated by FIG. 1. At step 506, an indication to change the contact-representative image may be received. For example, a user may indicate a desire to change an image in an address book entry (e.g., image 110 of FIG. 1) by selecting the image.

At step 508, other images corresponding to the contact may be determined. For example, other images of the contact may be found by analyzing metadata associated with the images or performing facial recognition analysis on the images, as described above with reference to FIG. 4. At step 510, images corresponding to the contact may be displayed. For example, the corresponding images may be displayed on interface 300 of FIG. 3, as described above. At step 512, a selection of an image is received. For example, a user may select an image displayed on interface 300 of FIG. 3 as described above with reference to FIG. 4. At step 514, the selected image is displayed. For example, the selected image may be displayed as image 110 of FIG. 1.

Automatic Face Selection System and Process

Figure 6:
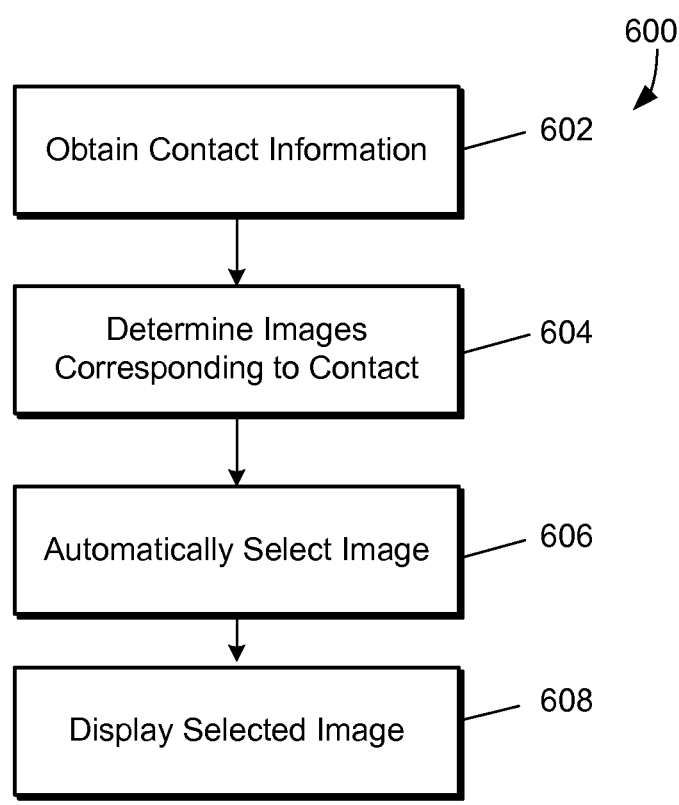
FIG. 6 is a flow diagram of an example automatic face selection process.

FIG. 6 is a flow diagram of an example automatic face selection process 600. According to some implementations, automatic face selection process 600 may be performed automatically in response to generating a new entry in an address book, creating a new user account on a system, or adding a new buddy to a chat application. According to some implementations, automatic face selection process 600 may be performed automatically in response to storing new images on a storage device, adding new images to an image library or capturing a new image with an image capture device, such as a camera, for example. According to some implementations, automatic face selection process 600 may be performed automatically to update a contact-representative image when a more recent or more highly user-ranked image than the current contact-representative image becomes available or when an image is marked as a key image, as described below.

At step 602, contact information is obtained. For example, contact information may be obtained according to the mechanisms described with reference to FIG. 4 and FIG. 5, above. At step 604, images corresponding to a contact are determined. For example, images that correspond to a contact may be determined according to the processes described with reference to block 408 of FIG. 4 and step 508 of FIG. 5, above.

At step 606, an image is automatically selected. For example, an image may be automatically selected from the images that were determined to correspond to the contact at step 604. In some implementations, an image may be automatically selected based on metadata associated with the image. An image may be automatically selected based on metadata that indicates that the image is a key image. For example, a key image is an image that has been selected and/or marked by a user to represent a group of images. A key image may be an image selected by a user to represent images associated with an event, for example. An image may be selected based on metadata that indicates that the image is a highly ranked image. For example, an image may have an associated ranking. The image may be automatically selected if the image has the highest user-assigned ranking of a group of images, for example. An image may be selected based on metadata that indicates that the image is the most recent image of the contact. For example, metadata associated with the image may include a timestamp that indicates the date and/or time that the image was captured. The timestamp may be used to determine that the image is the most recent image of the contact. According to implementations, the automatically selected image may be set as the image representing the contact.

At step 608, the automatically selected image is displayed. For example, the automatically selected image may be displayed as a contact-representative image in an address book entry, as a user image on a login screen, or as an image representative of a "buddy" in a chat application.

In some embodiments, a newly captured image may be automatically set as a contact-representative image. For example, a computing device may be coupled to an image capture device. A new image may be captured using the image capture device. Facial recognition analysis may be performed on the new image to determine if the contact's face can be recognized in the new image. If the contact's face is recognized in the new image, the new image may be automatically set as the image representing the contact and displayed as a contact-representative image. For example, the new image may be displayed as a contact-representative image in an address book entry, displayed as an image representing a user on a login screen, or displayed as an image representing a buddy in a chat program in response to matching the new image to a contact.

Example System Architecture

Figure 7:
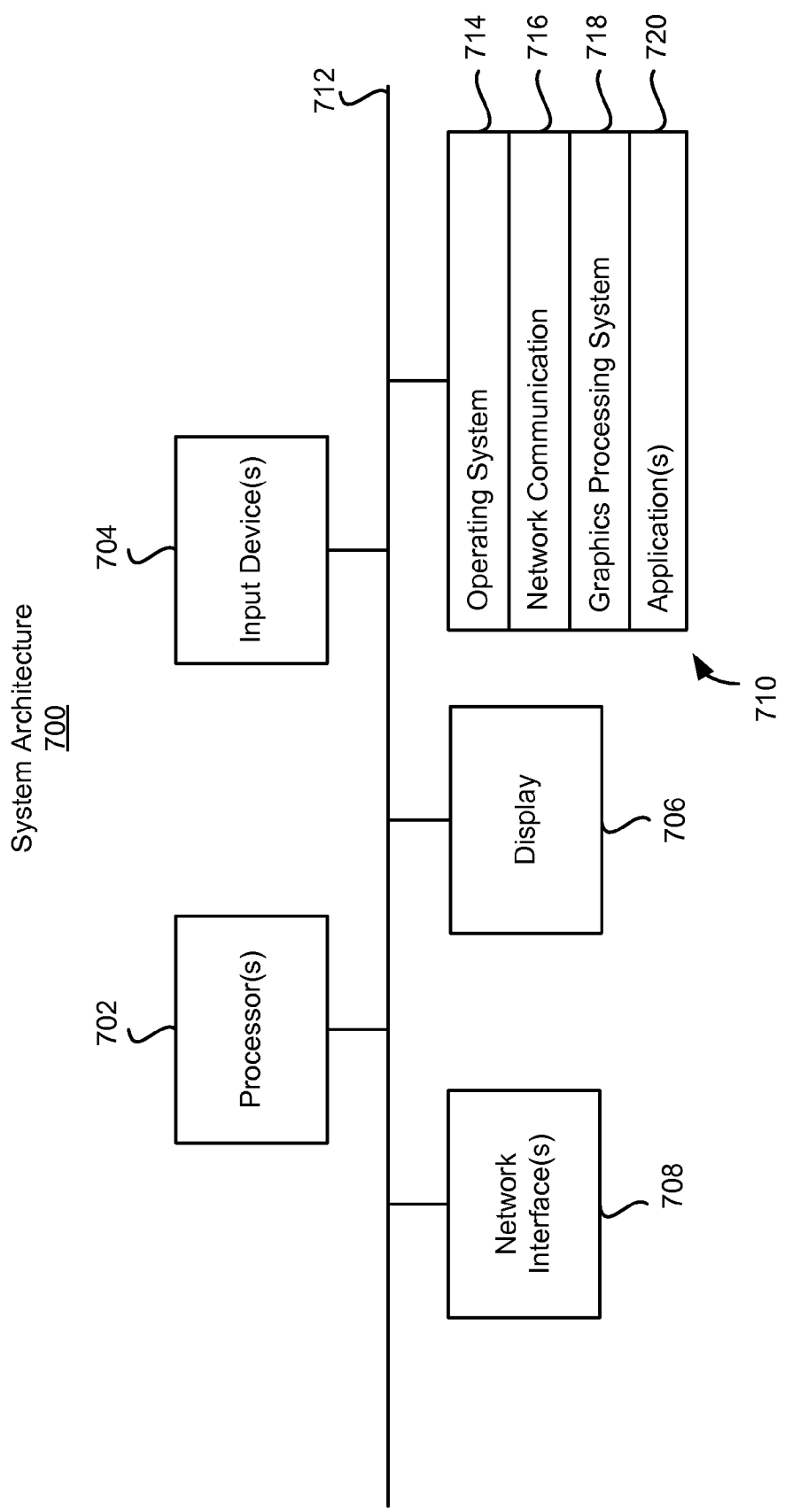
FIG. 7 is a block diagram of an example system architecture implementing the features and processes of FIGS. 1-6.

FIG. 7 is a block diagram of an example system architecture implementing the features and processes of FIGS. 1-6. The architecture 700 can be implemented on any electronic device that runs software applications derived from compiled instructions, including without limitation personal computers, servers, smart phones, media players, electronic tablets, game consoles, email devices, etc. In some implementations, the architecture 700 can include one or more processors 702, one or more input devices 704, one or more display devices 706, one or more network interfaces 708 and one or more computer-readable mediums 710. Each of these components can be coupled by bus 712.

Display device 706 can be any known display technology, including but not limited to display devices using Liquid Crystal Display (LCD) or Light Emitting Diode (LED) technology. Processor(s) 702 can use any known processor technology, including but are not limited to graphics processors and multi-core processors. Input device 704 can be any known input device technology, including but not limited to a keyboard (including a virtual keyboard), mouse, track ball, and touch-sensitive pad or display. Bus 712 can be any known internal or external bus technology, including but not limited to ISA, EISA, PCI, PCI Express, NuBus, USB, Serial ATA or FireWire. Computer-readable medium 710 can be any medium that participates in providing instructions to processor(s) 702 for execution, including without limitation, non-volatile storage media (e.g., optical disks, magnetic disks, flash drives, etc.) or volatile media (e.g., SDRAM, ROM, etc.).

Computer-readable medium 710 can include various instructions 714 for implementing an operating system (e.g., Mac OS®, Windows®, Linux). The operating system can be multi-user, multiprocessing, multitasking, multithreading, real-time and the like. The operating system performs basic tasks, including but not limited to: recognizing input from input device 704; sending output to display device 706; keeping track of files and directories on computer-readable medium 710; controlling peripheral devices (e.g., disk drives, printers, etc.) which can be controlled directly or through an I/O controller; and managing traffic on bus 712. Network communications instructions 716 can establish and maintain network connections (e.g., software for implementing communication protocols, such as TCP/IP, HTTP, Ethernet, etc.).

A graphics processing system 718 can include instructions that provide graphics and image processing capabilities. For example, the graphics processing system 718 can implement the resampling processes, as described with reference to FIGS. 1-6.

Application(s) 720 can be an image processing application or any other application that uses the resampling processes described in reference to FIGS. 1-6, such as a photo or video editor. The resampling processes can also be implemented in operating system 714.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A method comprising:
   obtaining, by a computing device, contact information associated with a contact in an address book;
   presenting, by the computing device, a first user interface that displays the contact information and a representative photograph of the contact;
   receiving, by the computing device, user input to change the representative photograph;
   in response to the user input, identifying, by the computing device, other photographs of the contact by comparing metadata associated with the other photographs to the contact information; and
   generating, by the computing device, data for displaying on a second user interface the other photographs, where the other photographs are displayed on the second user interface in a n by n grid with a center cell of the grid displaying the representative photograph of the contact and the other cells of the grid displaying the other photographs of the contact, where n is an odd integer greater than or equal to 3.

2. The method of claim 1, further comprising:
   receiving a selection of one of the other photographs displayed on the second user interface; and
   generating data for displaying on the first user interface the selected photograph as the contact-representative photograph.

3. The method of claim 1, wherein the other photographs are displayed based on one or more dates associated with the other photographs.

4. The method of claim 1, wherein the other photographs are displayed based on a user-assigned ranking associated with the other photographs.

5. The method of claim 1, wherein the contact information comprises a name associated with the contact and identifying the other photographs includes determining that the other photographs have metadata corresponding to the name.

6. The method of claim 1, wherein receiving the user input includes receiving a selection of the displayed contact-representative photograph.

7. A method comprising:
   generating, by a computing device, data for displaying a photograph representative of a contact in an address book;
   receiving, by the computing device, an indication to change the representative photograph;
   capturing a new photograph of the contact with a photograph capture device;
   performing, by the computing device, facial recognition on the new photograph and other photographs to identify other photographs that contain a facial view of the contact based on the new photograph; and
   generating, by the computing device, data for displaying the identified photographs and the new photograph, where the identified photographs are displayed in a n by n grid with a center cell of the grid displaying the new photograph of the contact and the other cells of the grid displaying the identified photographs of the contact, where n is an odd integer greater than or equal to 3.

8. The method of claim 7, further comprising:
   receiving a selection of a photograph from the identified photographs and the new photograph; and
   generating data for displaying the selected photograph as the representative photograph of the contact.

9. A non-transitory computer-readable medium including one or more sequences of instructions which, when executed by one or more processors, cause:

generating data for displaying a photograph representative of a contact;

receiving an indication to change the representative photograph;

capturing a new photograph of the contact with a photograph capture device;

performing facial recognition on the new photograph and other photographs to identify other photographs that contain a facial view of the contact based on the new photograph; and generating data for displaying the identified photographs and the new photograph, where the identified photographs are displayed in a n by n grid with a center cell of the grid displaying the new photograph of the contact and the other cells of the grid displaying the identified photographs of the contact, where n is an odd integer greater than or equal to 3.

10. The non-transitory computer-readable medium of claim 9, wherein the instructions include instructions that cause:

receiving a selection of a photograph from the identified photographs and the new photograph; and generating data for displaying the selected photograph as the representative photograph of the contact.

11. A non-transitory computer-readable medium including one or more sequences of instructions which, when executed by one or more processors, cause:

obtaining, by a computing device, contact information associated with a contact in an address book;

presenting, by the computing device, a first user interface that displays the contact information and a representative photograph of the contact;

receiving, by the computing device, user input to change the representative photograph;

in response to the user input, identifying, by the computing device, other photographs of the contact by comparing metadata associated with the other photographs to the contact information; and generating, by the computing device, data for displaying on a second user interface the other photographs, where the other photographs are displayed on the second user interface in a n by n grid with a center cell of the grid displaying the representative photograph of the contact and the other cells of the grid displaying the other photographs of the contact, where n is an odd integer greater than or equal to 3.

12. The non-transitory computer-readable medium of claim 11, further comprising:

receiving a selection of one of the other photographs displayed on the second user interface; and generating data for displaying on the first user interface the selected photograph as the contact-representative photograph.

13. The non-transitory computer-readable medium of claim 11, wherein the other photographs are displayed based on one or more dates associated with the other photographs.

14. The non-transitory computer-readable medium of claim 11, wherein the other photographs are displayed based on a user-assigned ranking associated with the other photographs.

15. The non-transitory computer-readable medium of claim 11, wherein the contact information comprises a name associated with the contact and identifying the other photographs includes determining that the other photographs have metadata corresponding to the name.

16. The non-transitory computer-readable medium of claim 11, wherein receiving the user input includes receiving a selection of the displayed contact-representative photograph.

* * * * *